United States Patent
Brucker et al.

(10) Patent No.: US 10,691,808 B2
(45) Date of Patent: Jun. 23, 2020

(54) VULNERABILITY ANALYSIS OF SOFTWARE COMPONENTS

(71) Applicant: SAP SE, Walldorf (DE)

(72) Inventors: Achim D. Brucker, Sheffield (GB); Stanislav Dashevskyi, Trento (IT)

(73) Assignee: SAP SE, Walldorf (DE)

( * ) Notice: Subject to any disclaimer, the term of this patent is extended or adjusted under 35 U.S.C. 154(b) by 214 days.

(21) Appl. No.: 14/965,449

(22) Filed: Dec. 10, 2015

(65) Prior Publication Data

US 2017/0169229 A1    Jun. 15, 2017

(51) Int. Cl.
*G06F 21/57*    (2013.01)
*G06F 21/56*    (2013.01)

(52) U.S. Cl.
CPC ......... *G06F 21/577* (2013.01); *G06F 21/566* (2013.01); *G06F 2221/033* (2013.01)

(58) Field of Classification Search
CPC ............... G06F 21/577; G06F 21/566; G06F 2221/1033; G06F 2221/033
See application file for complete search history.

(56) References Cited

U.S. PATENT DOCUMENTS

| | | | | |
|---|---|---|---|---|
| 7,284,274 | B1 * | 10/2007 | Walls | G06F 8/70 726/25 |
| 7,430,670 | B1 * | 9/2008 | Horning | G06F 21/14 713/190 |
| 7,627,543 | B2 * | 12/2009 | Lock | G06N 5/025 706/47 |
| 7,937,697 | B2 * | 5/2011 | Alberti | G06F 8/65 717/169 |
| 8,146,151 | B2 * | 3/2012 | Hulten | G06F 21/51 726/16 |
| 8,473,505 | B2 | 6/2013 | Brucker et al. | |
| 8,516,464 | B2 * | 8/2013 | Harrop | G06F 9/44552 717/153 |
| 8,819,525 | B1 * | 8/2014 | Holmer | H03M 13/33 714/775 |

(Continued)

FOREIGN PATENT DOCUMENTS

CN    102414668 A  *  4/2012  ............... G06F 8/75

OTHER PUBLICATIONS

Cadariu ("Tracking Known Security Vulnerabilities in Third-Party Components," Thesis, Aug. 22, 2014, pp. 1-86). (Year: 2014).*

(Continued)

*Primary Examiner* — Luu T Pham
*Assistant Examiner* — James J Wilcox
(74) *Attorney, Agent, or Firm* — Fish & Richardson P.C.

(57) ABSTRACT

Methods, systems, and apparatus, including computer programs encoded on a computer storage medium, for receiving an application developed by a first vendor. Processing the application, by performing a byte-code analysis of the application, to: identify a plurality of software components used by the application that were developed by vendors other than the first vendor, and provide a list of third-party software components associated with the application, the list including each of the identified software components. determining, for each software component included in the list, whether the software component has a vulnerability and, if so, selectively providing code to correct the vulnerability of the software component.

19 Claims, 5 Drawing Sheets

(56) References Cited

U.S. PATENT DOCUMENTS

| | | | |
|---|---|---|---|
| 8,881,293 B1 | 11/2014 | Brucker et al. | |
| 8,918,448 B2* | 12/2014 | DeLuca | G06F 8/61 709/200 |
| 8,959,646 B2 | 2/2015 | Brucker et al. | |
| 9,032,520 B2* | 5/2015 | Banzhof | H04L 63/1433 726/22 |
| 9,235,716 B1 | 1/2016 | Brucker et al. | |
| 9,256,512 B1* | 2/2016 | Shiraishi | G06F 11/3604 |
| 9,256,757 B2 | 2/2016 | Brucker et al. | |
| 9,286,187 B2 | 3/2016 | Brucker et al. | |
| 9,305,168 B2 | 4/2016 | Brucker et al. | |
| 9,471,285 B1* | 10/2016 | Koohgoli | G06F 8/751 |
| 2002/0087734 A1* | 7/2002 | Marshall | G06F 9/50 719/310 |
| 2003/0126472 A1* | 7/2003 | Banzhof | G06F 21/577 726/25 |
| 2003/0159063 A1* | 8/2003 | Apfelbaum | G06F 21/577 726/25 |
| 2004/0128530 A1* | 7/2004 | Isenberg | H04L 63/1433 726/25 |
| 2004/0168152 A1* | 8/2004 | Kramer | G06F 8/71 717/120 |
| 2005/0071616 A1* | 3/2005 | Zimmer | G06F 9/4401 713/1 |
| 2005/0108573 A1* | 5/2005 | Bennett | H04L 63/0245 726/4 |
| 2005/0198527 A1* | 9/2005 | Johnson | G06F 21/577 726/22 |
| 2006/0117310 A1* | 6/2006 | Daniels | G06F 8/68 717/168 |
| 2007/0234070 A1* | 10/2007 | Horning | G06F 21/14 713/190 |
| 2007/0271617 A1* | 11/2007 | Mitomo | G06F 9/44589 726/25 |
| 2008/0022268 A1* | 1/2008 | Wagner | G06F 8/456 717/145 |
| 2008/0082974 A1* | 4/2008 | Ellison | G06F 8/71 717/170 |
| 2008/0148408 A1* | 6/2008 | Kao | G06F 21/577 726/25 |
| 2008/0178287 A1* | 7/2008 | Akulavenkatavara | G06F 11/3644 726/22 |
| 2008/0263671 A1* | 10/2008 | Solino Testa | G06F 21/577 726/25 |
| 2009/0132999 A1* | 5/2009 | Reyes | G06F 11/3668 717/124 |
| 2009/0138699 A1* | 5/2009 | Miyazaki | G06F 21/57 713/150 |
| 2009/0320008 A1* | 12/2009 | Barsness | G06F 8/443 717/151 |
| 2010/0037100 A1* | 2/2010 | Lopian | G06F 11/3688 714/35 |
| 2010/0306851 A1* | 12/2010 | Zhou | G06F 21/554 726/25 |
| 2011/0126187 A1* | 5/2011 | Alberti | G06F 8/65 717/172 |
| 2011/0185433 A1* | 7/2011 | Amarasinghe | G06F 21/54 726/25 |
| 2011/0197253 A1* | 8/2011 | Tas | G06F 21/57 726/1 |
| 2012/0180133 A1* | 7/2012 | Al-Harbi | H04L 63/1433 726/25 |
| 2013/0139132 A1* | 5/2013 | Kass | G06F 8/447 717/139 |
| 2013/0185798 A1* | 7/2013 | Saunders | G06F 21/56 726/24 |
| 2014/0082733 A1* | 3/2014 | Benefield | G06F 21/577 726/25 |
| 2014/0096255 A1* | 4/2014 | Beskrovny | G06F 21/577 726/25 |
| 2014/0096258 A1* | 4/2014 | Beskrovny | G06F 21/577 726/25 |
| 2014/0165204 A1* | 6/2014 | Williams | G06F 21/577 726/25 |
| 2014/0282488 A1* | 9/2014 | Tagliabue | G06F 3/1204 717/174 |
| 2015/0007197 A1* | 1/2015 | Tripp | G06F 9/46 718/106 |
| 2015/0020066 A1* | 1/2015 | Kirk | G06F 21/56 718/1 |
| 2015/0040229 A1* | 2/2015 | Chan | G06F 21/577 726/25 |
| 2015/0047046 A1* | 2/2015 | Pavlyushchik | G06F 21/577 726/25 |
| 2015/0101056 A1* | 4/2015 | Eberlein | G06F 21/577 726/25 |
| 2015/0106873 A1* | 4/2015 | Marsh | G06F 21/577 726/1 |
| 2015/0106939 A1* | 4/2015 | Lietz | H04L 63/1433 726/25 |
| 2015/0186652 A1* | 7/2015 | Guarnieri | G06F 21/577 726/25 |
| 2015/0278491 A1* | 10/2015 | Horning | G06F 21/14 726/26 |
| 2015/0301849 A1* | 10/2015 | Du | G06F 9/50 718/1 |
| 2015/0304351 A1* | 10/2015 | Oberheide | H04W 12/12 726/25 |
| 2015/0347119 A1* | 12/2015 | Wang | G06F 16/1744 717/120 |
| 2016/0019071 A1* | 1/2016 | Webb | G06F 8/31 719/331 |
| 2016/0188882 A1* | 6/2016 | Mahrous | G06F 21/577 726/25 |
| 2016/0188885 A1* | 6/2016 | Lee | G06F 21/577 726/25 |
| 2016/0232359 A1* | 8/2016 | Carpenter | G06F 8/71 |
| 2016/0246963 A1* | 8/2016 | Sheth | G06F 21/565 |
| 2016/0259636 A1* | 9/2016 | Plate | G06F 11/366 |
| 2016/0381060 A1* | 12/2016 | Floering | H04L 63/1433 726/25 |
| 2017/0097818 A1* | 4/2017 | Heine | G06F 16/214 |
| 2017/0118219 A1* | 4/2017 | Nguyen | H04L 63/102 |
| 2017/0139803 A1* | 5/2017 | Maheshwari | G06F 11/3495 |
| 2017/0153882 A1* | 6/2017 | Gopalakrishnan | G06F 8/65 |

OTHER PUBLICATIONS

Google Translation of CN102414668A (Year: 2012).*
Parrend-Enhancing Automated Detection of Vulnerabilities in Java Components, 2009 International Conference on Availability, Reliability and Security, pp. 216-223 (Year: 2009).*
Balakrishnan-Automated Diagnosis and Prevention of Unsafe Dynamic Software Component Loadings, Proceedings of 2013 IEEE Conference on Information and Communication Technologies, ICT 2013, pp. 739-743 (Year: 2013).*
Frei-Large Scale Vulnerability Analysis, LSAD'06: Proceedings of the 2006 SIGCOMM Workshop on Large-Scale Attack Defense, Sep. 2006, pp. 131-138 (Year: 2006).*
Yu-Software Vulnerability Analysis for Web Services Software Systems, Proceedings of the 11th IEEE Symposium on Computers and Communications (ISCC '06), pp. 1-9 (Year: 2006).*

* cited by examiner

VULNERABILITY ANALYSIS OF SOFTWARE COMPONENTS

BACKGROUND

Software applications are generally developed by integrating many existing software components. That is, instead of developing new applications from a blank slate, most software applications are built by combining many, at times hundreds of, existing software components such as, proprietary components (e.g., closed-source libraries or device drivers) and Free and Open Source Software (FOSS) components. Furthermore, these components are often created and offered by third-party vendors (e.g., vendors other than the developer of an application that incorporate the components).

Yet, a software vendor that distributes software applications is responsible for ensuring the security of the final applications, regardless of the security of individual components of the application. In other words, a vendor that distributes a software application has the same responsibility to ensure the security of third-party components of the application as it has for the application code developed by the vendor itself. In general, this leads to the need for complex and dynamic software tracking and security monitoring policies.

SUMMARY

Implementations of the present disclosure include methods for analyzing and monitoring the security of components incorporated into software applications. In some implementations, methods include actions of receiving an application developed by a first vendor. Processing the application, by performing a byte-code analysis of the application, to: identify a plurality of software components used by the application that were developed by vendors other than the first vendor, and provide a list of third-party software components associated with the application, the list including each of the identified software components. determining, for each software component included in the list, whether the software component has a vulnerability and, if so, selectively providing code to correct the vulnerability of the software component.

This and other implementations can each optionally include one or more of the following features.

In some implementations, the method can include the action of providing a report indicating which of the plurality of software components in the list have vulnerabilities.

In some implementations, processing the application can include identifying a first set of the plurality of software components by performing a first analysis of the application, where the first analysis is an analysis of byte-code of the application to identify the software components based on links to dynamic libraries, and identifying a second set of the plurality of software components by performing a second analysis of the application.

In some implementations, the second analysis can be an analysis of the application to identify the software components based on static dependencies of the software application.

In some implementations, the second analysis can be an analysis of source code of the application to identify the software components based on portions of the software components used by the application.

In some implementations, the second analysis can be an analysis of the application to identify the software components based on run-time dependencies of the software application.

In some implementations, the processing the application can include the actions of determining that a name of a first software component identified by the first analysis is identical to a name of a second software component identified by the second analysis. Determining to include the first software component in list of third-party software components and to not include the second software component in the list of third-party software components, where the determination is based on characteristics of the first analysis and characteristics of the second analysis.

In some implementations, the first analysis can be performed at a first stage of development of the application and the second analysis is performed at a second stage of development of the application.

In some implementations, the list of third-party software components can include characteristics associated with each of the software components.

In some implementations, the characteristics can include one of a major version of the software component, a minor version of the software component, and origin of the software component.

In some implementations, determining, for each software component in the list, whether the software component has an exploitable vulnerability can include regularly querying a server system for vulnerabilities associated with the software component.

In some implementations, the server system can be a database listing known vulnerabilities. In some implementations, the server system can be a web site of a third-party vendor.

In some implementations, the determining, for each software component in the list, whether the software component has an exploitable vulnerability can include determining a version of the software component for which the vulnerability has been corrected.

In some implementations, determining, for each software component in the list, whether the software component has an exploitable vulnerability can include the actions of identifying a portion of the software component affected by the vulnerability, and determining whether the application is exposed to the portion of the software component affected by the vulnerability.

In some implementations, identifying the portion of the software component affected by the vulnerability can include identifying a specific function or method of the software component that is affected by the vulnerability.

In some implementations, determining whether the application is exposed to the portion of the software component affected by the vulnerability can include the actions of determining whether the application uses the portion of the software component affected by the vulnerability, and determining whether the portion of the software component affected by the vulnerability can be accessed from the application by a user.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are general directed to analyzing and monitoring the security of components incorporated into software applications. More particularly, implementations of the present disclosure are directed to generating a comprehensive bill of materials (BOM) for a software application and managing the security of the application. In some implementations, a BOM for a software application is a list of individual components (e.g., software libraries, device drivers, open source code) used by or incorporated into the application. In some implementations, the BOM can be used to monitor the security of each individual component of the application. In some implementations, the BOM can be used to track updates (e.g., security patches) to the components and to develop and distribute corresponding updates to the application.

As noted above, vendors develop software applications by combining a various components, such as proprietary components (e.g., closed-source libraries or device drivers) and Free and Open Source Software (FOSS) components. Furthermore, these components are often created and offered by third-parties, over which the vendor that develops and distributes a software application has little or no control. For example, proprietary software may be produced by a software vendor that offers commercial support for the component. In some cases, proprietary software is only available in binary form and modifying the source code (as well as distributing modified copies) is not permitted. Thus, a vendor who incorporates a proprietary software component in an application depends fully on the vendor of that component to monitor the security of the component and provide updates to fix any vulnerabilities. In contrast to proprietary software, FOSS components may be distributed in source code form, and modifications to the source code may be permitted. However, FOSS components generally have little or no direct security monitoring support from the software's distributor, but such services may be available from other sources.

Yet, a software vendor that distributes software applications is responsible for ensuring the security of the final applications, regardless of the security of individual components of the application. In other words, a vendor that distributes a software application has the same responsibility to ensure the security of third-party components of the application as to it has for the application code developed by the vendor itself.

As discussed in further detail herein, implementations of the present disclosure provide an efficient and reliable method for generating a comprehensive BOM for a software application and managing the security of the application. In some implementations, a BOM is developed for an application by analyzing multiple aspects of the application and combining the results into comprehensive list of application components (e.g., components used by or incorporated into the application). In some implementations, the BOM can be generated by analyzing aspects of the application at several stages of the application's development and distribution. For example, a BOM can be automatically generate based on analyses of the application's source code, build configuration, binary code, and deployment configuration. In some implementations, the BOM includes detailed information about application components. For example, the BOM can include component names, version information (e.g., major and minor versions), vendor identities, updates, update dates, vulnerability information, etc. The BOM can be generated based on one or more of the following analyses of an application. In some examples, the analyses can include static analyses or analyses to detect code similarity.

For example, at the build stage, a build configuration (e.g., maven or ant configurations) of an application can be analyzed to determine a list of components (e.g., libraries and packages) that will be integrated into the application during compilation. In some examples, the build configuration analysis can be performed for each of multiple builds of an application. In some examples, the build configuration analysis is performed for each production build of an application (e.g., builds where the build will be distributed to customers).

In some implementations, the source code of an application (e.g., modules, imports, API function calls) can be analyzed at the build stage. For example, source code analysis can provide a more fine-grained analysis to determine specific functions, classes, or data structures of components that are exposed by (e.g., used or incorporated into) the application. More specifically, the term "exposed" refers to a portion of a software component (e.g., functions, classes, or data structures) that is used by the application (e.g., called by code of the application), that is directly incorporated into the application (e.g., code from a component is incorporated into the code of an application), or that can be accessed by a user of the application (e.g., a user can call portion of the software component). In some examples, the source code analysis can analyze aspects of the source code of the applications that are automatically generated at build time. In some implementations, the source code analysis can be performed for each of multiple builds of an application. In some examples, the source code analysis is performed for each production build of an application.

In some examples, at the compile stage, the binary code (or byte-code) of an application can be analyzed. For example, a byte-code analysis can provide information about components that are not included in the application until after compilation. For example, byte-code analysis can provide information about byte-code components, standard libraries, and other components that are added (e.g., automatically) by the compiler. In some implementations, the byte-code analysis can be performed for each of multiple builds of an application. In some examples, the byte-code analysis is performed for each production build of an application.

In some examples, at the deployment stage, the deployment information (e.g., the artifacts that determine how the application is deployed or installed) in a runtime container can be analyzed. For example, a deployment analysis can provide information about the actual runtime configuration of an application that is not available at compile-time (e.g., information about components that are linked with the application at deployment). For example, application deployment can be the installation of an application on a customer's computing device (e.g., a mobile app installed on a smartphone or tablet computer or a software program installed on a laptop or desktop computer) for "on-premise" applications (e.g., applications that are primarily stored on and executed on a user's computing device). Whereas, application deployment can be the implementation of an application for a cloud (server) based application (e.g., applications that are primarily stored on and executed by a server, such as a Software-as-a-Service (SAAS) offerings). In some implementations, the deployment analysis can be performed for each deployment of an application. For example, the deployment analysis can be integrated into the deployment process for cloud-based applications. For on-premise applications, the deployment analysis can be performed for the test deployment of an application before an on-premise application is distributed to customers.

In some implementations, the BOM can be used to monitor the security of application components and track updates to application components. For example, databases or vendor web sites that list known vulnerabilities of software components can be queried for each component (or each version of a component) that is listed in the BOM. Furthermore, the BOM can be revised to track updates to a component (e.g., version updates, patches, etc.) and information for which update(s) or version(s) of the component correct different vulnerabilities. In some implementations, the databases are queried using common nomenclature and natural language processing to extract the unstructured and semi-structured data related to the application components. In some implementations, if a vulnerable component is detected, a vulnerability report can be generated and provided to customers who purchased the application. In some examples, code can be generated to fix the vulnerability (e.g., an application update or patch).

Figure 1:
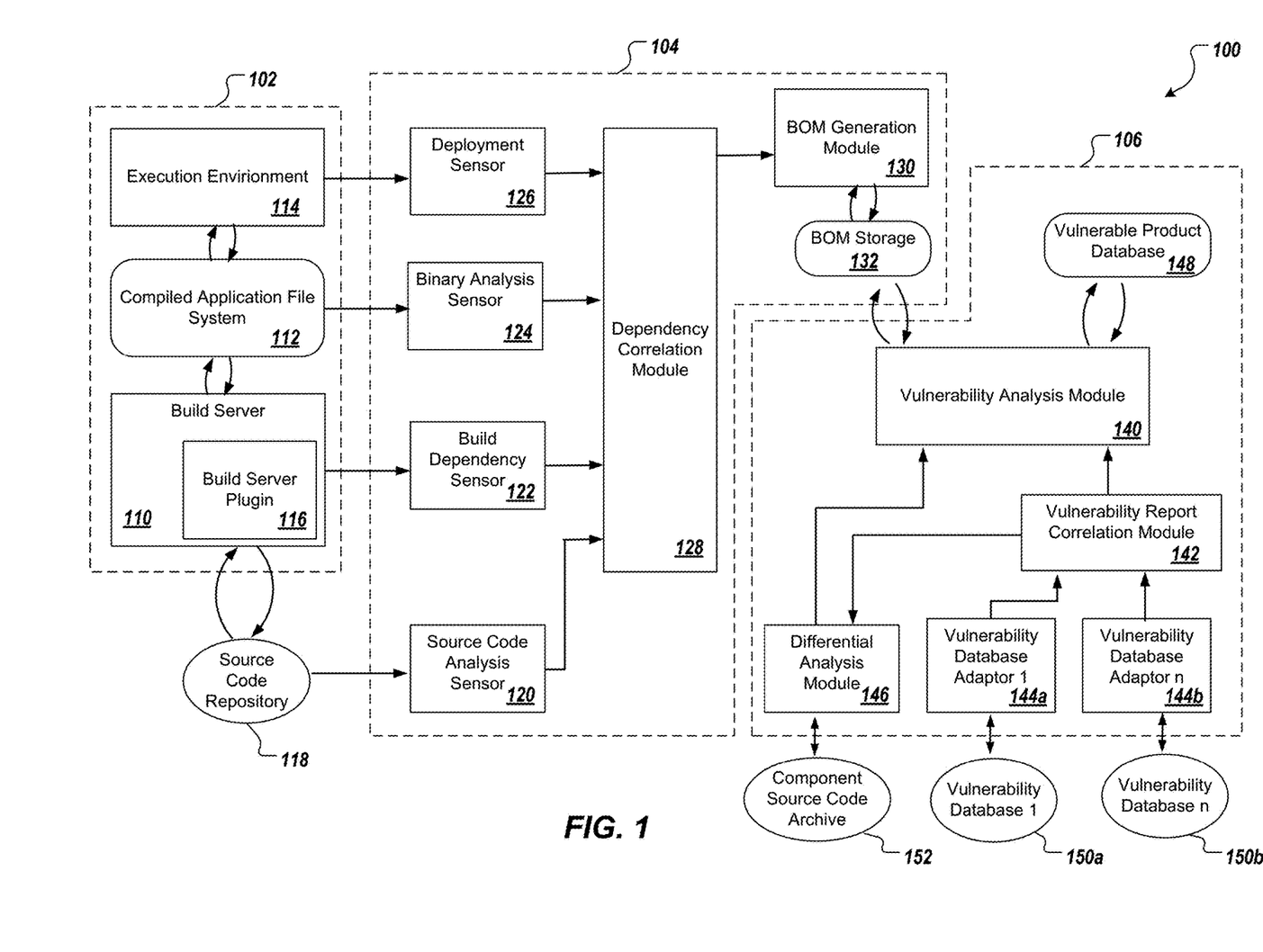
FIG. 1 depicts an example system architecture for executing implementations of the present disclosure.

FIG. 1 depicts an example system architecture 100 for executing implementations of the present disclosure. The system architecture 100 includes a development system 102, an application analysis system 104, and a component monitoring system 106. As discussed herein, the application analysis system 104 receives code associated with a software application from the development system 102. The application analysis system 104 processes the code to identify software components exposed by the application and to generate a BOM for the application. The component monitoring system 106 can access the BOM and monitor for vulnerabilities in the components exposed by an application to track component updates and provide corresponding updates for the application.

In the depicted example, the development system 102 includes a build server 110, a compiled application file system 112, and an execution environment 114. In some examples, the development system 102 is provided as one or more computer-executable programs that can be executed using one or more computing devices. For example, the development system 102 can provide a user interface for developers to create, debug, and modify program code.

In some examples, the build server 110 is a component of the development system 102 that assembles and compiles computer code (e.g., source code) for software applications. The build server 110 can be, for example, a Jenkins build server. In some examples, the build server 110 includes a build server plugin 116. In some examples, the build server 110 can be part of a build system (e.g., maven, ant, make, node.js). The build server plugin 116 can be provided as one or more computer-executable programs that is integrated into the build server or the build system. The build server plugin 116 identifies application components (e.g., dependencies of an application) that are required for building the applications. For example, the build server plugin 116 can identify names and versions of component dependencies of an application while the build server 110 assembles and compiles the application. In some examples, the build server plugin 116 provides an interface between the build server 110 and the source code analysis sensor 120 of the application analysis system 104 (described in more detail below).

In some examples, application source code can be stored in a source code repository 118 that is accessible to the build server 110 and the source code analysis sensor 120 (discussed in more detail below). The source code repository 118 can be an electronic storage (e.g., file system or a database) that stores the source code (including annotations to the source code). The source code repository 118 can permit components of the development system 102 (e.g., the build server 110) and the application analysis system (e.g., source code analysis sensor 120) to access (e.g., read and write data) program code stored in the source code repository 118. In some examples, the source code repository 118 can provide access to different versions (e.g., historical versions) of program code. In some examples, the source code repository 118 can be a file system, a database, or a versioning system (e.g., git or subversion).

In some examples, the compiled application file system 112 is a component of the development system 102 where the build server 110 stores compiled applications. For example, the compiled application file system 112 can be a local or network electronic storage system (e.g., a file system) where the build server 110 stores compiled applications.

In some examples, the execution environment 114 is a component of the development system 102 where compiled applications can be deployed. For example, the execution environment 114 can be a runtime environment where compiled applications can be deployed for testing or deployed as cloud-based applications. For example, the execution environment 114 can be desktop operating system for testing on-premise desktop applications, a mobile operating system for testing on-premise mobile applications, or a server environment (e.g., Tomcat) for deploying cloud-based applications.

In the depicted example, the application analysis system 104 includes a several analysis sensors (120, 122, 124, 126), a dependency correlation module 128, a BOM generation module 130, and BOM storage 132. In some examples, the application analysis system 104 is provided as one or more computer-executable programs that can be executed using one or more computing devices. In some examples, the application analysis system 104 performs one or more static analyses on a software application to identify components of the application (e.g., third-party components) and generate a BOM for the application. For example, the application analysis system 104 include one or more of the following sensors for performing analyses on an application at various stages of development and deployment: a source code analysis sensor 120, a build dependency sensor 122, a binary analysis sensor 124, and a deployment sensor 126.

In some examples, the source code analysis sensor 120 can access application source code from the source code repository 118. The source code analysis sensor 120 can analyze the source code to identify application components at the application programming interface (API) level. In some examples, the source code analysis sensor 120 can identify application components based on the import/module specification of application source code. For example, the source code analysis sensor 120 can analyze the source code of an application (e.g., modules, imports, API function calls) at the build stage. For example, the source code analysis sensor 120 can provide a fine-grained analysis of application source code to determine specific functions, classes, or data structures of components that are exposed by (e.g., used or incorporated into) the application. For example, the source code analysis sensor 120 can identify specific functions, classes, or data structures of components that are exposed an application based on module specifications in the source code, for example:

var circle=require('./circle.js');

or based on calls to APIs, for example:

```
$.get( "ajax/test.html", function( data ) {
    $( ".result" ).html( data );
    alert( "Load was performed." );
});
``` which indicates the use of jQuery.

In some examples, the build dependency sensor 122 can interface with the build system 110 through the build server plugin 116. The build dependency sensor 122 can analyze the configuration of the build system (e.g., pom.xml in case of maven, the build.xml in case of ant, or Makefiles in case of traditional C/C++ builds) to identify components of an application. In some examples, the build dependency sensor 122 can identify application components based on static dependencies of the application. For example, at the build stage, the build dependency sensor 122 can analyze the build configuration (e.g., maven or ant configurations) of an application to determine a list of components (e.g., libraries and packages) that will be integrated into the application during compilation. In some examples, the build dependency sensor 122 can analyze pom.xml files of a maven build configuration to identify application components based on dependencies specified within the pom.xml file. In some examples, the build dependency sensor 122 can parse the output of an autoconf configure script to identify application components based on the header and library checks.

In some examples, binary analysis sensor 124 can access compiled application byte-code (e.g., binary code) from the compiled application file system 112. The binary analysis sensor 124 can de-compose and analyze the byte-code of an application to identify components of the application. For example, the binary analysis sensor 124 can analyze the byte-code of an application to identify application components based on application dependencies that are shipped as part of the binary code. For example, at the compile stage, the binary analysis sensor 124 can perform a byte-code analysis of an application to provide information about components that are not included in the application until after compilation. For example, byte-code analysis can provide information about byte-code components, standard libraries, and other components that are added (e.g., automatically) by the compiler. For Java applications (e.g., jar-archives), for example, application components can be identified based on un-packing the archives. For C/C++ applications, for example, the dynamic linker can be analyzed to identify components based on dependencies related to dynamic libraries.

In some examples, the deployment sensor 126 can monitor the actual or test deployment of an application in the execution environment 114. The deployment sensor 126 can analyze the deployment configuration of an application to identify application components based on runtime dependencies of the application. For example, at the deployment stage, the deployment sensor 126 can analyze the deployment information (e.g., the artifacts that determine how the application is deployed or installed) of an application in the execution environment 114. For example, the deployment sensor 126 can provide information about application components based on the actual runtime configuration of an application that is not available at compile-time (e.g., information about components that are linked with the application at deployment).

In some examples, the dependency correlation module 128 is a component of the application analysis system 104 that receives component information from one or more of the sensors (120, 122, 124, 126), and correlates the application component information. For example, two or more of the sensors may detect the same component, but with different precision. For example, the build analysis sensor 122 may only detect the name of a component and its major version, while the binary analysis sensor 124 may detect the minor version of the component as well. Yet, the build analysis may be able to determine the origin of the component. The dependency correlation module 128 can correlate the information from both sensors 120, 122 to avoid duplicating entries in the BOM and to provide precise information about application components in the BOM.

In some examples, the dependency correlation module 128 also classifies the identified application components. For example, not all application components are actually used for each different build configuration of an application. Moreover, applications can include build-dependencies, such as parser generators, that are required for the build but not actually included in the final application (e.g., only artifacts generated by the components are shipped). In some examples, the dependency correlation module 128 can automatically classify application components by determining from the component information received from the sensors (120, 122, 124, 126) in which stage of development a component is used and in which application build configuration the component is required.

In some examples, not all not all application components can be classified at each stages of the build and deployment cycle of an application. For example, scripting languages may not have a proper module specification and may not use build dependencies at all. Moreover, some components can only be detected by analyzing the API calls. Therefore, by correlating the information from multiple different sensors, the application analysis system 104 may avoid missing application components when building the BOM for an application.

In some examples, the BOM generation module 130 is a component of the application analysis system 104 that receives correlated component information from the dependency correlation module 128 and generates a BOM for an application. For example, the BOM generation module 130 can automatically generate a BOM based on correlated component information from the dependency correlation module 128. In some implementations, the BOM includes detailed information about application components. For example, the BOM can include component names, version information (e.g., major and minor versions), vendor identities, updates, update dates, vulnerability information, etc. In some examples, the level of detail in a BOM depends on which sensors (120, 122, 124, 126) are used to analyze an application. The BOM generation module 130 can store BOMs associated with various applications or various builds of an application in the BOM storage 132. The BOM storage 132 can be a local or network electronic storage system (e.g., a file system) where the BOM generation module 130 stores BOMs.

In the depicted example, the component monitoring system 106 includes a vulnerability analysis module 140, a vulnerability report correlation module 142, one or more vulnerability database adaptors 144a, 144b, a differential analysis module 146, and a vulnerable product database 148. In some examples, the component monitoring system 106 is provided as one or more computer-executable programs that can be executed using one or more computing devices. For example, the component monitoring system 106 can use a BOM to monitor for vulnerabilities of and corresponding updates (e.g., code fixes or patches) to components of an application.

For example, the component monitoring system 106 can access BOMs for applications from the BOM storage 132. For example, BOMs provide a detailed list of third-party components used by applications that are developed and offered to customers by a vendor. The component monitoring system 106 regularly (e.g., hourly, daily) collect vulnerability information from multiple sources (e.g., vulnerability databases). The vulnerability information can be correlated with the BOM to determine whether an application component has a vulnerability, and, if so, which component(s) of an application have a vulnerability. The correlation can be based on the name and version of the component identified by the vulnerability information. In some examples, the component monitoring system 106 can provide appropriate notices or updates (e.g., code fixes or patches) to users of the respective application.

In some examples, the vulnerability report correlation module 142 is a component of the component monitoring system 106 that correlates vulnerability information from various vulnerability sources such as publicly available vulnerability databases (e.g., National Institute of Standards and Technology (NIST) common vulnerabilities and exposures (CVE) database, and national vulnerability database (NVDB)) or information published by vendor-specific databases (e.g. SAP Security Notes). In some examples, the vulnerability report correlation module 142 receives vulnerability information from one or more database adaptors 144a, 144b. For example, the vulnerability database adaptors 144a, 144b can be adapted to parse and categorize (e.g., using natural language processing (NLP) techniques) unstructured and semi-structured information from vulnerability databases 150a, 150b. In some examples, a vulnerability database adaptor 144a, 144b can be specific to a particular vulnerability database 150a, 150b. For example, vulnerability database adaptor 144a can be a dedicated vulnerability adaptor configured to parse and categorize information from the vulnerability database 150a (e.g., a NIST CVE database). Similarly, for example, vulnerability database adaptor 144b can be a dedicated vulnerability adaptor configured to parse and categorize information from the vulnerability database 150b (e.g., a vendor-specific web page). In some examples, the vulnerability database adaptors 144a, 144b can convert vulnerability information into a common format used by the vulnerability report correlation module 142.

In some examples, the vulnerability analysis module 140 is a component of the component monitoring system 106 that analyzes determines whether applications are affected by vulnerabilities identified in a component of the application. For example, the vulnerability analysis module 140 can receive vulnerability information from the vulnerability report correlation module 142 and a BOM associated with an application from the BOM storage 132. The vulnerability analysis module 140 can correlate the vulnerability information with the application's BOM to determine whether any of the components used by the application are affected by a vulnerability.

In some examples, the differential analysis module 146 is a component of the component monitoring system 106 that analyzes the source code or, in some examples, the byte-code of application components to identify the a portion of a software component (e.g., API, function, configuration option, class, or data structure) that is affected by a vulnerability. For example, the differential analysis module 146 can evaluate vulnerability information received from the vulnerability report correlation module 142 about an application component and analyze the source code or byte-code of the component to determine which portion or portions of the component are affected by the vulnerabilities. In some examples, the differential analysis module 146 can access source or byte-code of application components from a component code archive 152. The component code archive 152 containing multiple releases of various application components. In some examples, the component code archive 152 can include all of the versions (e.g., historical versions) of particular application components (e.g., free and open source software (FOSS) components). In some examples, the component code archive 152 can include access to a source code repository (including adapters) in which releases of application components are accessible by tags or dedicated commit messages.

In some implementations, the vulnerability analysis module 140 receives additional vulnerability information from the differential analysis module 146. In such implementations, the vulnerability analysis module 140 can further analyze the vulnerability information received from both the vulnerability report correlation module 142 and the differential analysis module 146 to identify, for example, the last vulnerable and the first fixed versions of a component; changes between component versions, and which portions of a component are affected by vulnerabilities. The vulnerability analysis module 140 can use the BOM of an application to determine if the application exposes a vulnerability in a component. For example, the vulnerability analysis module 140 can determine based on information in the BOM indicating portions of the component that are used by the application whether the application exposes the vulnerability.

In some examples, the vulnerability analysis module 140 can use the vulnerability information to configure a static source code analysis system to identify any insecure usage patterns of the component by the application. For example, a static program analysis (e.g., static code analysis (SCA) or static application security testing (SAST)) can be used to determine whether an application is affected by a vulnerability of one of its components (e.g., if the vulnerable functionality is actually exposed by the application). For example, the static analysis of an application can be configured to identify vulnerable uses of a vulnerable component. In some examples, a full re-analysis of the application can be performed using the configured static analysis. In some examples, the static analysis can be performed on the application based on a high-level representation of the program (e.g., a program dependency graph).

In some examples, the vulnerability analysis module 140 can identify changes between component version based on released versions or commits to a source code control system. In some examples, the vulnerability analysis module 140 can determine the severity of component vulnerabilities (or the severity of effects of the vulnerability on the application). In some examples, the vulnerability analysis module 140 can determine whether vulnerabilities are known to have been exploited.

In some examples, the vulnerability analysis module 140 stores vulnerability analysis results in a vulnerable product database 148. The vulnerable product database 148 can be a local or network electronic storage system (e.g., a file system). In some examples, the vulnerability analysis module 140 generates a vulnerability report that based on the vulnerability analysis results for an application. In some examples, the vulnerability report can be categorized and sorted.

Figure 2:
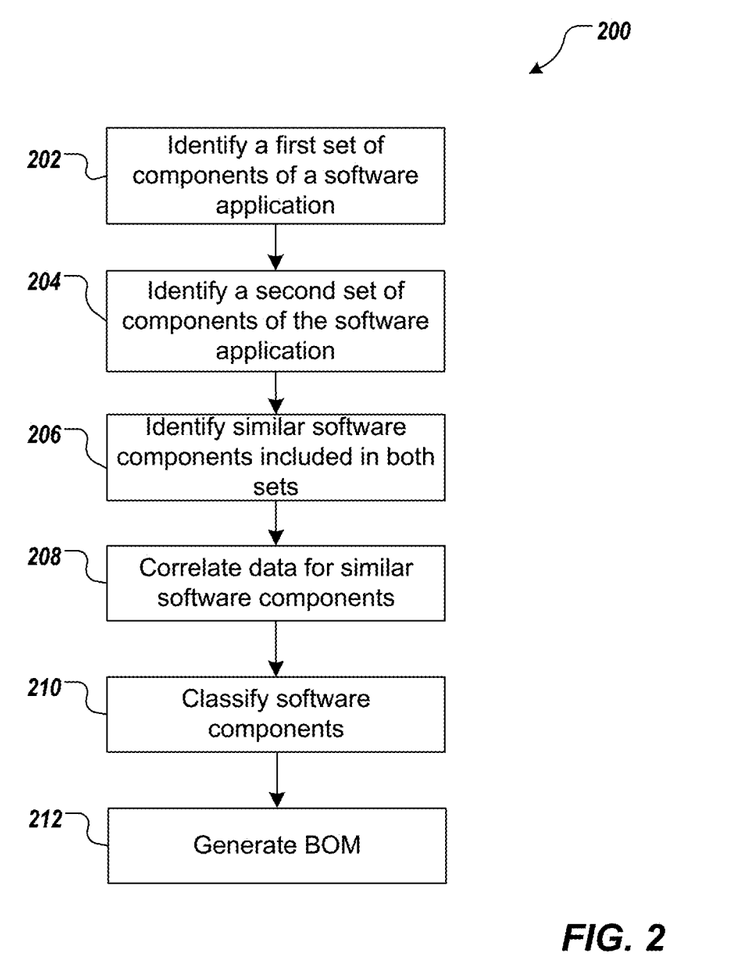
FIG. 2 depicts an example process that can be executed in accordance with implementations of the present disclosure.

FIG. 2 is a flowchart illustrating an example process 200 that can be executed in implementations of the present disclosure. In some implementations, the example process 200 can be realized using one or more computer-executable programs that are executed using one or more computing devices. In some implementations, the example process 200 can be used for generating a BOM for a software application.

A first set of components of a software application are identified (202), and a second set of components of the software application are identified (204). More particularly, the first and second set of components can include data related to software components (e.g., third-party components) that are used by the software application. For example, and with reference to FIG. 1, the application analysis system 104 can identify the first set of components using a first sensor and the second set of components using a second sensor. For example, the application analysis system 104 can identify the first and second sets of components using a source code analysis sensor 120, a build dependency sensor 122, a binary analysis sensor 124, or a deployment sensor 126. For example, the first and second set can be obtained based on analyses of the application's source code, build configuration, binary code, and/or deployment configuration.

Similar components included in both sets are identified (206). For example, the application analysis system 104 can identify similar components included in both the first and second set of application components. Data associated with similar software components is correlated (208). For example, the application analysis system 104 can correlate data from both the first and second sets that is associated with particular component included in both sets. For example, the first set may include the name of a component and its major version, while the second set may include the minor version of the component as well as the component name and major version. The application analysis system 104 can correlate the information from both sets to avoid including duplicate data in the BOM and while ensuring that the BOM includes all available information about the component.

The components of the application are classified (210). For example, each component from the sets of components can be classified based on data associated with the component and included in one of the sets. In some examples, each component can be classified based on whether the component is exposed by the application or in which builds the component is exposed by the application. A BOM is generated for the application (212). For example, a BOM can be automatically generated based on component data included in the sets of application components. In some examples, the BOM can include detailed information about application components. For example, the BOM can include component names, version information (e.g., major and minor versions), vendor identities, updates, update dates, etc.

Figure 3:
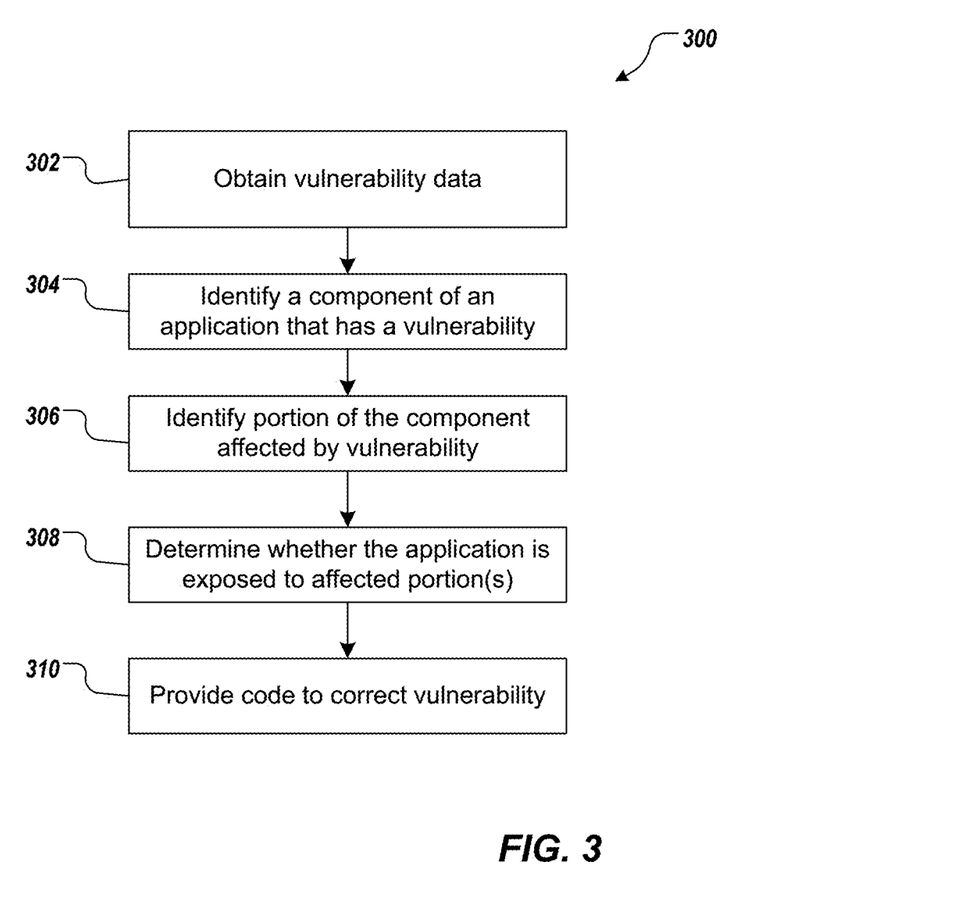
FIG. 3 depicts an example process that can be executed in accordance with implementations of the present disclosure

FIG. 3 is a flowchart illustrating an example process 300 that can be executed in implementations of the present disclosure. In some implementations, the example process 300 can be realized using one or more computer-executable programs that are executed using one or more computing devices. In some implementations, the example process 300 can be used for monitoring components of a software application for vulnerabilities.

Vulnerability data is obtained (302). More particularly, the vulnerability data can include data identifying a software component that has a vulnerability and information associated with the vulnerability. In some examples, the vulnerability information can identify a last vulnerable and the first fixed version of a component. In some implementations, the vulnerability information can identify which portions of a component are affected by vulnerabilities. For example, and with reference to FIG. 1, the component monitoring system 106 can obtain vulnerability information from vulnerability databases or component code archives. A component of an application that has a vulnerability is identified (304). For example, the vulnerability information can be correlated with a BOM for an application to determine identify any components of the application that have a vulnerability. A portion of the component affected by a vulnerability can be identified (306). For example, a portion of the component affected by a vulnerability can be, for example, a particular API, function, configuration option, class, or data structure of the component that is affected by the vulnerability. In some examples, the portion of the component affected by a vulnerability can be determined based on the vulnerability information. In some examples, the portion of the component affected by a vulnerability can be determined based on an analysis of the source code or byte-code of the component.

It is determined whether the application is exposed to the affected portion of the component (308). For example, the BOM of an application can identify which portions of each component used by an application are exposed by the application. Thus, the BOM can be used to determine whether affected portion(s) of a vulnerable component are exposed by the application. If an affected portion of a vulnerable component is exposed by an application, code can be provided to correct the vulnerability (310). For example, an update to the application can be generated and provided to customers who purchased the application.

Figure 4:
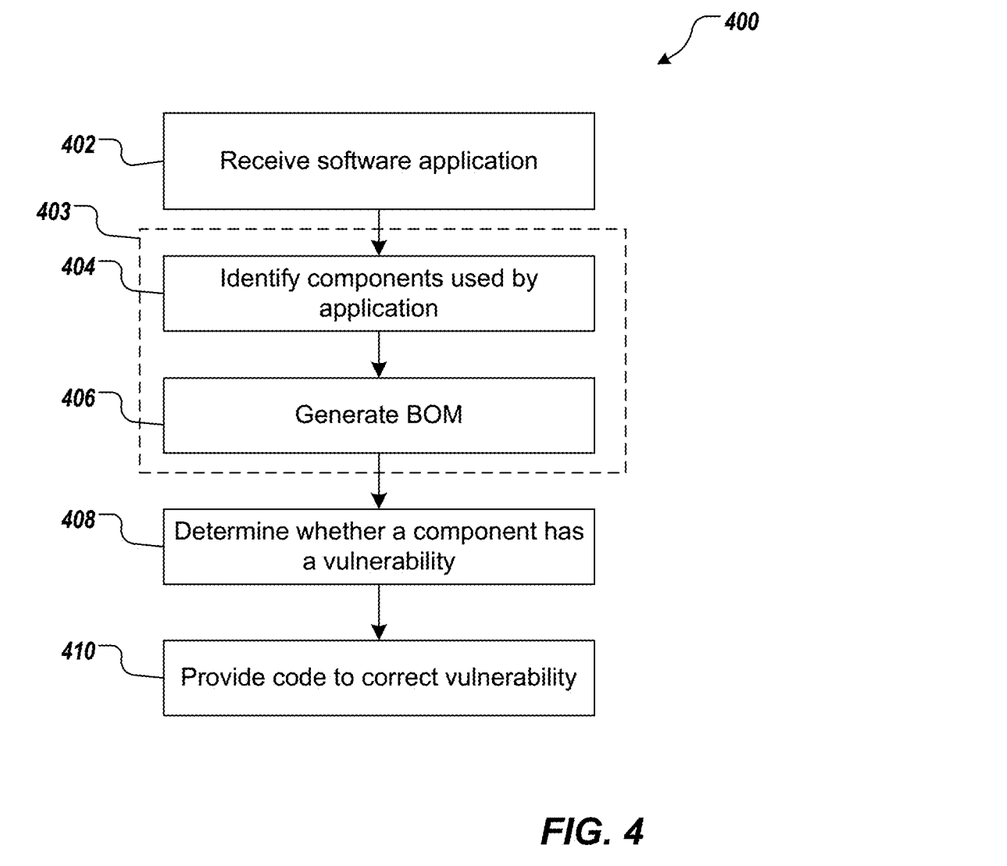
FIG. 4 depicts an example process that can be executed in accordance with implementations of the present disclosure.

FIG. 4 is a flowchart illustrating an example process 400 that can be executed in implementations of the present disclosure. In some implementations, the example process 400 can be realized using one or more computer-executable programs that are executed using one or more computing devices. In some implementations, the example process 400 can be used for generating an application BOM and monitoring components of an application for vulnerabilities.

A software application is received (402). For example, a software application developed by a first vendor can be received by an application analysis system 104, as shown in FIG. 1 and described above. The application can be processed (403). For example, the application can be processed by the application analysis system 104. In some examples, the application analysis system 104 can perform a byte-code analysis of the application. The application can be processed to identify a plurality of software components used by the application (404), and provide a list the components used by the application (406). For example, the list can be a BOM for the application and can include each of the identified software components. The identified components can include software components that were developed by vendors other than the first vendor. For each software component included in the list, it can be determined whether the component has a vulnerability (408). For example, a process such as process 300 of FIG. 3 can be used to monitor the components in the list for vulnerabilities. If a component is determined to have a vulnerability, code can selectively be provided to correct the vulnerability (410). For example, an update to the application can be generated and provided to customers who purchased the application.

Figure 5:
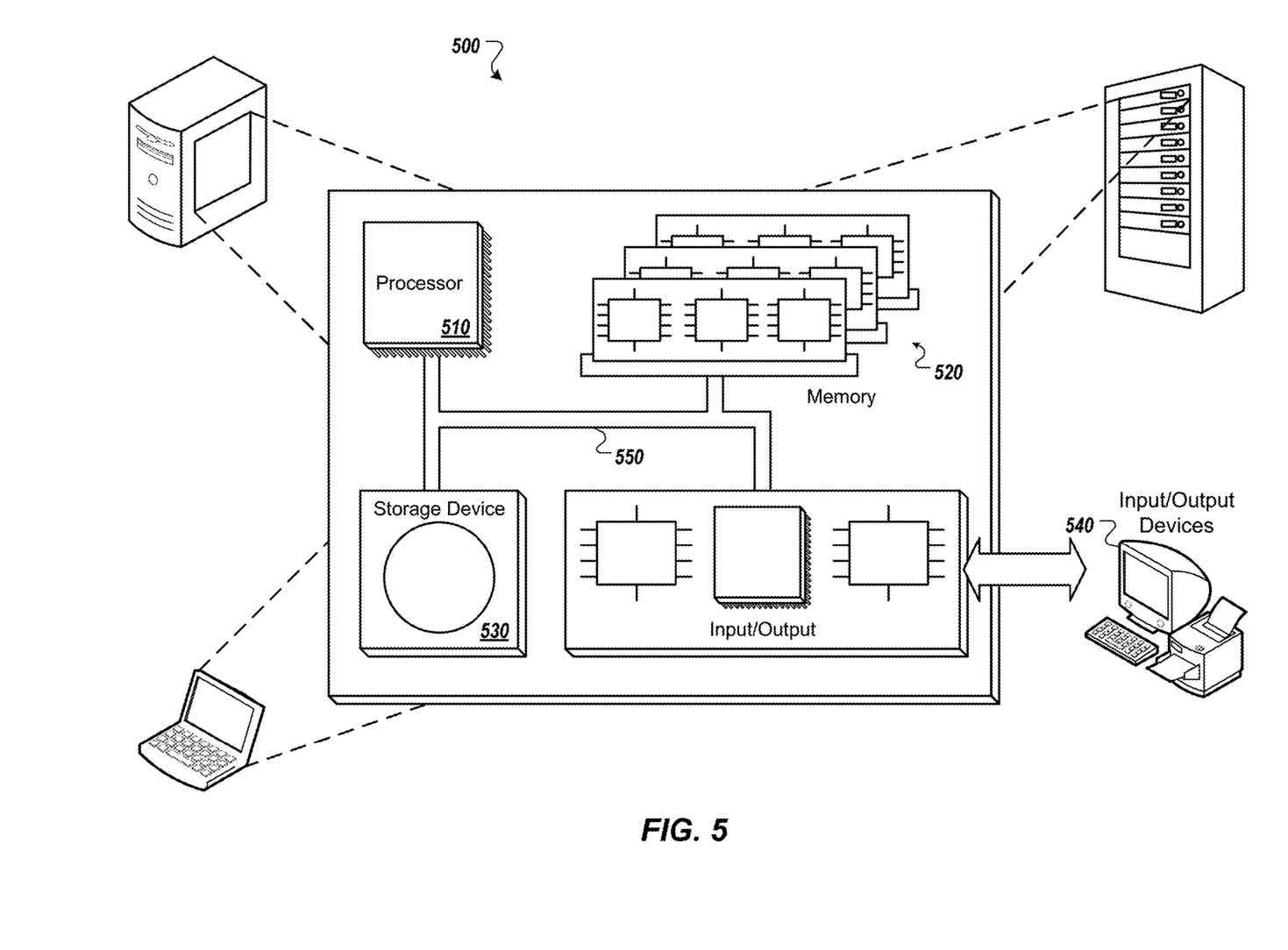
FIG. 5 is a schematic illustration of example computer systems that can be used to execute implementations of the present disclosure.

FIG. 5 is a schematic illustration of example computer systems 500 that can be used to execute implementations of the present disclosure. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for monitoring security of an application, the method being executed by one or more processors and comprising:

receiving, by the one or more processors, the application developed by a first vendor;

processing, by the one or more processors, the application using an application analysis system that comprises a plurality of analysis sensors, processing comprising:

identifying a plurality of software components used by the application that were developed by vendors other than the first vendor using a first sensor of the application analysis system to provide first component information, and a second sensor of the application analysis system to provide second component information, the first sensor comprising a binary analysis sensor configured to de-compose and analyze the application to provide the first component information comprising post-compilation information corresponding to a first portion of the plurality of software components that are included in the application after compilation, the second sensor comprising a deployment sensor configured to monitor a test deployment of the application in an execution environment based on runtime dependencies of the application and to provide the second component information comprising deployment information, and providing a list of third-party software components associated with the application at least partially by performing a correlation of the post-compilation information and the deployment information, the list comprising each of the identified software components and component information comprising origins of the identified software components, version information, and vulnerability information, wherein the correlation eliminates duplication of the identified software components and avoids missing application components that are visible for only one of the first sensor and the second sensor;

for each software component included in the list, processing, by the one or more processors, the component information to determine a vulnerability of the software component; and correcting the vulnerability of the software component by selectively providing a code to a computing device configured to execute the application, in response to determining the vulnerability of the software component.

2. The method of claim 1, comprising providing a report indicating which of the plurality of software components in the list have vulnerabilities.

3. The method of claim 1, wherein processing the application comprises:

identifying a first set of the plurality of software components by performing a first analysis of the application, wherein the first analysis is an analysis of byte-code of the application to identify the software components based on links to dynamic libraries; and identifying a second set of the plurality of software components by performing a second analysis of the application.

4. The method of claim 3, wherein the second analysis is an analysis of the application to identify the software components based on static dependencies of the application.

5. The method of claim 3, wherein the second analysis is an analysis of source code of the application to identify the software components based on portions of the software components used by the application.

6. The method of claim 3, wherein the second analysis is an analysis of the application to identify the software components based on run-time dependencies of the application.

7. The method of claim 3, wherein processing the application comprises:

determining that a name of a first software component identified by the first analysis is identical to a name of a second software component identified by the second analysis; and determining to include the first software component in list of third-party software components and to not include the second software component in the list of third-party software components, wherein the determination is based on characteristics of the first analysis and characteristics of the second analysis.

8. The method of claim 3, wherein the first analysis is performed at a first stage of development of the application and the second analysis is performed at a second stage of development of the application.

9. The method of claim 1, wherein the list of third-party software components comprises characteristics associated with each of the software components.

10. The method of claim 9, wherein the characteristics comprise one of a major version of a first component of the software components, a minor version of a second component of the software components, and an origin of a third component of the software components.

11. The method of claim 1, wherein determining, for each software component in the list, whether the software component has an exploitable vulnerability comprises regularly querying a server system for vulnerabilities associated with the software component.

12. The method of claim 11, wherein the server system is a database listing known vulnerabilities.

13. The method of claim 11, wherein the server system is a website of a third-party vendor.

14. The method of claim 1, wherein determining, for each software component in the list, whether the software component has the vulnerability comprises determining a version of the software component, for which the vulnerability has been corrected.

15. The method of claim 1, wherein determining, for each software component in the list, whether the software component has the vulnerability comprises:

identifying a portion of the software component affected by the vulnerability; and determining whether the application is exposed to the portion of the software component affected by the vulnerability.

16. The method of claim 15, wherein identifying the portion of the software component affected by the vulnerability comprises identifying a specific function or method of the software component that is affected by the vulnerability.

17. The method of claim 15, wherein determining whether the application is exposed to the portion of the software component affected by the vulnerability comprises:
    determining whether the application uses the portion of the software component affected by the vulnerability; and
    determining whether the portion of the software component affected by the vulnerability can be accessed from the application by a user.

18. A system for monitoring security of an application, the system comprising:
    one or more computers; and
    a computer-readable medium coupled to the one or more computers having instructions stored thereon which, when executed by the one or more computers, cause the one or more computers to perform operations, the operations comprising:
        receiving the application developed by a first vendor;
        processing the application using an application analysis system that comprises a plurality of analysis sensors, processing comprising:
            identifying a plurality of software components used by the application that were developed by vendors other than the first vendor using a first sensor of the application analysis system to provide first component information, and a second sensor of the application analysis system to provide second component information, the first sensor comprising a binary analysis sensor configured to de-compose and analyze the application to provide the first component information comprising post-compilation information corresponding to a first portion of the plurality of software components that are included in the application after compilation, the second sensor comprising a deployment sensor configured to monitor a test deployment of the application in an execution environment based on runtime dependencies of the application and to provide the second component information comprising deployment information, and
            providing a list of third-party software components associated with the application at least partially by performing a correlation of the post-compilation information and the deployment information, the list comprising each of the identified software components and component information comprising origins of the identified software components, version information, and vulnerability information, wherein the correlation eliminates duplication of the identified software components and avoids missing application components that are visible for only one of the first sensor and the second sensor;
        for each software component included in the list, processing the component information to determine a vulnerability of the software component; and
        correcting the vulnerability of the software component by selectively providing a code to a computing device configured to execute the application, in response to determining the vulnerability of the software component.

19. A non-transitory computer-readable storage medium coupled to one or more processors and having instructions stored thereon which, when executed by the one or more processors, cause the one or more processors to perform operations for monitoring security of an application, the operations comprising:
    receiving the application developed by a first vendor;
    processing the application using an application analysis system that comprises a plurality of analysis sensors, processing comprising:
        identifying a plurality of software components used by the application that were developed by vendors other than the first vendor using a first sensor of the application analysis system to provide first component information, and a second sensor of the application analysis system to provide second component information, the first sensor comprising a binary analysis sensor configured to de-compose and analyze the application to provide the first component information comprising post-compilation information corresponding to a first portion of the plurality of software components that are included in the application after compilation, the second sensor comprising a deployment sensor configured to monitor a test deployment of the application in an execution environment based on runtime dependencies of the application and to provide the second component information comprising deployment information, and
        providing a list of third-party software components associated with the application at least partially by performing a correlation of the post-compilation information and the deployment information, the list comprising each of the identified software components and component information comprising origins of the identified software components, version information, and vulnerability information, wherein the correlation eliminates duplication of the identified software components and avoids missing application components that are visible for only one of the first sensor and the second sensor;
    for each software component included in the list, processing the component information to determine a vulnerability of the software component; and
    correcting the vulnerability of the software component bar selectively providing a code to a computing device configured to execute the application, in response to determining the vulnerability of the software component.

* * * * *